United States Patent
Prakash et al.

(10) Patent No.: US 10,894,610 B2
(45) Date of Patent: Jan. 19, 2021

(54) JET STREAM LIGHTNING PROTECTION APPARATUS, SYSTEM, AND METHOD THE SAME

(71) Applicant: The Boeing Company, Chicago, IL (US)

(72) Inventors: Om Prakash, Bangalore (IN); Kanakasabapathi Subramanian, Chennai (IN); Shantanu Pal, Chennai (IN); Radhakrishnan Anbarasan, Chennai (IN)

(73) Assignee: The Boeing Company, Chicago, IL (US)

( * ) Notice: Subject to any disclaimer, the term of this patent is extended or adjusted under 35 U.S.C. 154(b) by 643 days.

(21) Appl. No.: 15/614,557

(22) Filed: Jun. 5, 2017

(65) Prior Publication Data
US 2018/0346145 A1 Dec. 6, 2018

(51) Int. Cl.
- *B64D 45/02* (2006.01)
- *G01W 1/16* (2006.01)
- *H02H 9/06* (2006.01)
- *H02H 1/00* (2006.01)

(52) U.S. Cl.
CPC ............ *B64D 45/02* (2013.01); *G01W 1/16* (2013.01); *H02H 9/06* (2013.01); *H02H 1/0023* (2013.01)

(58) Field of Classification Search
CPC ............................ H01H 85/42; H01T 1/08–10
USPC .................................................. 361/118–123
See application file for complete search history.

(56) References Cited

U.S. PATENT DOCUMENTS

| | | | | |
|---|---|---|---|---|
| 4,663,692 A | * | 5/1987 | Carothers | H01C 7/12 361/117 |
| 5,963,413 A | * | 10/1999 | Zahlmann | H01T 4/10 361/118 |
| 6,072,684 A | * | 6/2000 | Eybert-Berard | H02G 13/00 361/212 |
| 7,218,123 B1 | * | 5/2007 | Tsamis | G01R 29/0842 324/658 |
| 8,711,541 B2 | * | 4/2014 | Umemoto | B64D 45/02 361/218 |
| 9,514,917 B1 | * | 12/2016 | McIver | H05H 1/52 |
| 2003/0021076 A1 | * | 1/2003 | Sillence | H01Q 1/42 361/218 |

(Continued)

FOREIGN PATENT DOCUMENTS

| | | |
|---|---|---|
| CN | 201478816 U | 5/2010 |
| CN | 202093903 U | 12/2011 |

(Continued)

OTHER PUBLICATIONS

J. Wang et al., "Research and application of a new jet stream arc extinguishing gap lightning protection device", Jan. 5, 2016, Electric Power Systems Research, vol. 139, pp. 161-169.

*Primary Examiner* — Tuan T Dinh
(74) *Attorney, Agent, or Firm* — McDonnell Boehnen Hulbert & Berghoff LLP (57) ABSTRACT

A lightning protection apparatus and related methods are described. The lightning protection apparatus includes a housing that defines a cavity, a gas generating device disposed within the housing, and a signal acquisition device. The housing is coupled to an aircraft. The signal acquisition device is configured to detect a lightning arc and responsively activate the gas generating device to emit a stream of gas to suppress the lightning arc.

20 Claims, 3 Drawing Sheets

(56) References Cited

U.S. PATENT DOCUMENTS

2005/0172637 A1\*  8/2005  Ponziani ................. F02C 7/266
                                                      60/776
2015/0194790 A1\*  7/2015  Wang ........................ H01T 1/10
                                                      361/123

FOREIGN PATENT DOCUMENTS

| CN | 101159368 B | 5/2012 |
| CN | 102486954 A | 6/2012 |
| CN | 102486956 A | 6/2012 |
| CN | 102592757 A | 7/2012 |
| CN | 103594210 A | 2/2014 |
| CN | 103594210 B | 10/2015 |

\* cited by examiner

810 Detect a lightning arc using a lightning protection apparatus coupled to an aircraft 820 After detecting the lightning arc, the lightning protection apparatus emitting a stream of gas to suppress the lightning arc

FIG. 8

JET STREAM LIGHTNING PROTECTION APPARATUS, SYSTEM, AND METHOD THE SAME

FIELD

The present disclosure generally relates to lightning protection devices, and more specifically, to devices that protect aircraft from lightning using streams of gas.

BACKGROUND

Enhanced protection of aircraft against lightning strikes or "flashovers" is a challenge for the modern aviation industry. The impact of a flashover can cause considerable damage and/or reduce the operational lifetime of the aircraft struck by lightning. Further, recently-designed and built aircraft use structural components made of composite materials, such as carbon sandwich and/or carbon laminate materials, rather than metallic components, such as components made from aluminum. These composite components are less conductive, and therefore potentially more susceptible to flashover damage, than metallic components. As such, protecting aircraft against flashovers and flashover damage is becoming increasingly important.

SUMMARY

In an example embodiment, a lightning protection apparatus is described. The lightning protection apparatus includes a housing, a gas generating device, and a signal acquisition device. The housing is coupled to an aircraft and the housing defines a cavity. The gas generating device is disposed within the housing. The signal acquisition device is configured to detect a lightning arc, and responsively activate the gas generating device to emit a stream of gas to suppress the lightning arc.

In another example embodiment, a method is described. A lightning protection apparatus coupled to an aircraft detects a lightning arc. After detecting the lightning arc, the lightning protection apparatus emits a stream of gas to suppress the lightning arc.

In a further example embodiment, a system is described. The system includes an aircraft and a lightning protection apparatus coupled to the aircraft. The lightning protection apparatus includes a housing, a gas generating device, and a signal acquisition device. The housing defines a cavity. The gas generating device is disposed within the housing. The signal acquisition device is configured to detect a lightning arc, and responsively activate the gas generating device to emit a stream of gas to suppress the lightning arc.

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

BRIEF DESCRIPTION OF THE FIGURES

Novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

A jet-stream lightning protection system suitable for use with aircraft is provided. The jet-stream lightning protection system includes a signal acquisition device, a gas generating device, and a housing for the device. The signal acquisition device and the gas generating device are mounted within the housing.

When a lightning arc occurs near the jet-stream lightning protection system, the signal acquisition device can detect the lightning arc and activate the gas generation device. The gas generating device can emit a high-speed jet stream of gas that can suppress the lightning arc through a longitudinal impact/stretch of the arc. In some examples, the jet-stream lightning protection system can quickly suppress the lightning; e.g., within a few microseconds. The high-speed jet stream of gas can also cool a surface struck by lightning; e.g., a surface of an aircraft. The jet-stream lightning protection system can significantly reduce the amount of energy transferred from the lightning arc to the aircraft and hence reduce or eliminate damage to the aircraft structure caused by the lightning strike.

In some examples, the signal acquisition device determines whether a potential difference between atmosphere around the aircraft (such as nearby clouds) and the aircraft is less than a breakdown voltage associated with lightning. In these conditions, no lightning arc is started between the atmosphere and the aircraft. During a lightning strike, the signal acquisition device detects that the potential difference between atmosphere around the aircraft and the aircraft has reached or exceeded the breakdown voltage. In response to detecting the breakdown voltage, the signal acquisition device activates the gas generation device. Activation of the gas generator leads to the above-mentioned high-speed jet stream of gas stream being formed. As the jet stream of gas has a high speed, the stream of gas elongates and reduces electrical and thermal effects due to the lightning arc, thus suppressing and eventually extinguishing the arc of lightning. In other examples, the signal acquisition device detects a current and/or an electric field associated with the arc of lightning; then, the signal acquisition device activates the gas generation device when the current and/or electric field is detected.

The gas generating device can be implemented using one or more devices providing gas streams. For example, the lightning protection system can have one gas generating device capable of providing a relatively-large amount of gas. As another example, the lightning protection system can have an array of two or more gas generating devices, each capable of providing a relatively-small amount of gas. In embodiments where the lightning protection system has multiple gas generating devices, the gas generating devices can be aimed in multiple different directions to provide different patterns of gas coverage on an area of the aircraft to be protected by flashovers. A gas generating device can be aimed in a fixed direction or be adjustable to move into two or more different directions.

In some examples, the lightning protection system includes one or more coverings or skirts coupled to the housing for protection against rain and/or hail. The covering(s)/skirt(s) can be made of a material that prevents rain or hail from gathering along a surface of the housing, such as plastic, rubber, and/or another water-resistant/water-proof material. In some examples, part or all of the housing is made of a water-resistant/water-proof material. In particular examples, the housing and covering(s)/skirt(s) are all made of the same material. In other examples, the lightning protection system includes one or more arc chutes for elongating and hence extinguishing arcs of lightning. In still other examples, the lightning protection system can be used on other vehicles than aircraft; e.g., motor vehicles, train cars, boats, etc.

The lightning protection system protects an object, such as an aircraft, from damage due to lightning strikes. In some cases, the lightning protection system extinguishes an arc of lightning before it strikes, avoiding any damage due to fail over. In other cases where an arc of lightning strikes the aircraft, a cooling gas stream is (or streams are) emitted by the lightning protection system to reduce and/or prevent damage due to overheating at a point of a lightning strike. By extinguishing arcs of lightning and/or reducing aircraft damage due to flashovers, the lightning protection system can make aircraft safer, reduce the costs and time to repair aircraft that have been struck by lightning, and increase confidence that an aircraft can successfully travel in weather conditions that include lightning.

Figure 1:
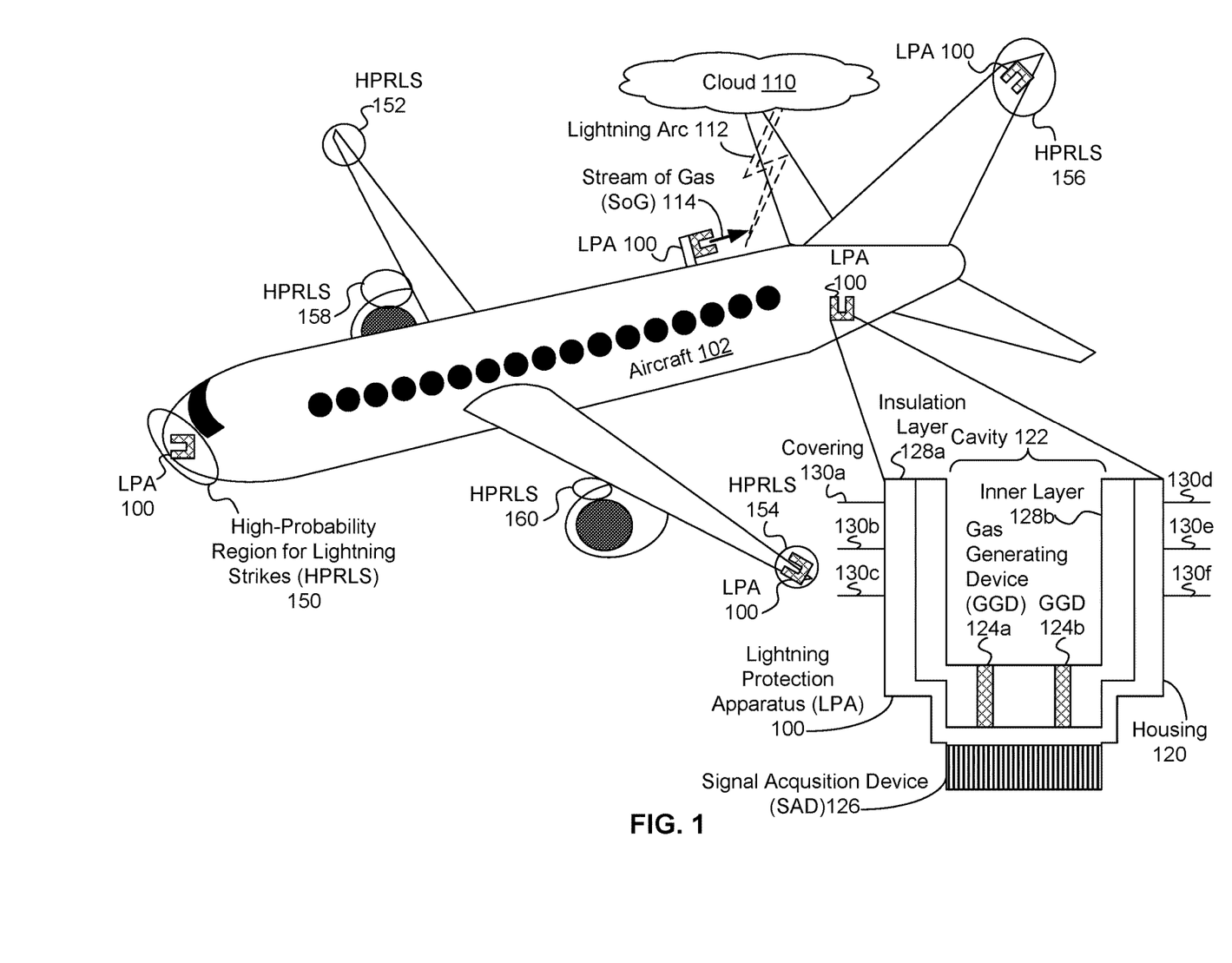
FIG. 1 is a diagram of an aircraft coupled to multiple lightning protection devices according to an example embodiment.

FIG. 1 is a diagram of aircraft 102 coupled to multiple lightning protection apparatus 100 according to an example embodiment. Aircraft 102 is shown flying near cloud 110 that has generated lightning arc 112. When aircraft 102 is struck or nearly struck by lightning, such as by lightning arc 112, a current can flow between a cloud, such as cloud 110, and lightning protection apparatus 100, which can embody the above-mentioned jet-stream lightning protection system. Upon detection of lightning arc 112, lightning protection apparatus 100 generates stream of gas (SoG) 114 to suppress and/or extinguish arc 112 and protect aircraft 102 from electrical and thermal effects of arc 112. In some examples, stream of gas 114 can elongate lightning arc 112 sufficiently to extinguish arc 112 before arc 112 reaches aircraft 102. In examples, stream of gas 114 can be made up of one or more of the following gases: air, nitrogen, carbon dioxide, carbon monoxide, sulfur hexafluoride, helium, neon, argon, krypton, and xenon. In principle, any gaseous material which is difficult to ionize even in presence of a lightning arc can be used. Other gases suitable for cooling, suppressing, and/or extinguishing lightning arcs can be used to make up stream of gas 114 as well.

As shown at lower-right of FIG. 1, lightning protection apparatus 100 includes housing 120, gas generating devices (GGDs) 124a, 124b, and signal acquisition device (SAD) 126, where housing 120 is shown being shaped to form cavity 122. Housing 120 also includes at least two layers—insulation layer 128a and inner layer 128b.

Signal acquisition device 126 is configured to detect one or more signals related to lightning, such as, but not limited to, one or more indications of electric current, ionization levels, and electric fields related to lightning, such as lightning arc 112. In some examples, current triggered by the flashover voltage of lightning arc 112 between lightning protection apparatus 100 and cloud 110 is detected by signal acquisition device 126 of lightning protection apparatus 100. In other examples, signal acquisition device 126 is connected in series a body of aircraft 102, such as shown in FIG. 1. When aircraft 102 is struck by lightning, such as by lightning arc 112, current flows between a cloud, such as cloud 110, and aircraft 102, and lightning protection apparatus 100 can sense this current. In some examples, signal acquisition device 126 is configured to sense one or more electric fields and/or relatively-high ionization levels associated with lightning arc 112.

After detecting the signal(s) related to lightning, signal acquisition device 126 generates and sends one or more activation signals to gas generating devices 124a, 124b. Upon activation, gas generating devices 124a, 124b generates one or more streams of gas; e.g., stream of gas 114. As gas generating devices 124a, 124b are in a semi-enclosed space formed by cavity 122, gas generated by gas generating devices 124a, 124b can reach a high gas pressure to form stream of gas 114. At the same time, inner layer 128b of housing 120 and cavity 122 accelerates cooling provided by stream of gas 114. Stream of gas 114 can have a significant impact on the lightning arc 112, as space of arc 112 is rapidly cooled while being arc 112. And stream of gas 114 can elongate lightning arc 112, perhaps to a point that arc 112 can no longer be maintained. That is, the effects of cooling and elongation can suppress and even extinguish lightning arc 112. Thus, lightning protection apparatus 100 can detect indications of lightning and responsively generate streams of gas to suppress and/or extinguish one or more arcs of lightning, thereby protecting aircraft 102 from lightning.

In some cases, signal acquisition device 126 detects signals related to lightning arc 112 before arc 112 reaches aircraft 102; for example, signal acquisition device 126 can be configured to detect electric fields, ionization levels, and/or other signals related to lightning arc 112 that occur before arc 112 reaches aircraft 102. In particular of these cases, signal acquisition device 126 sends activation signal(s) to gas generating devices 124a, 124b before lightning arc 112 reaches aircraft 102. In more particular of these cases, signal acquisition device 126 sends activation signal(s) to gas generating devices 124a, 124b in time so that gas generating devices 124a, 124b emit stream(s) of gas before lightning arc 112 reaches aircraft 102, thus enabling lightning protection apparatus 100 to suppress and/or extinguish arc 112 before arc 112 reaches aircraft 102.

In some examples, each of gas generating devices 124a, 124b generates a stream of gas upon activation, and one or both streams of gas are used as stream of gas 114 to suppress and/or extinguish lightning arc 112. In other examples, a passive mechanism (such as an exploding pressure chamber) is used with the sensor-triggered lightning protection apparatus 100. In still other examples, some or all of gas generating devices 124a, 124b release gas to form stream of gas 114 upon activation. That is, upon activation, one or more of gas generating devices 124a, 124b releases gas by one or more of: opening a valve or other closure upon activation, releasing gas generated by one or more materials stored by the gas generation device upon being electrically stimulated by the activation signal, and releasing gas generated by two or more materials upon being combined in response to the activation signal.

In further examples, some or all of gas generating devices 124a, 124b are connected to a gas line or gas pipe of aircraft 102 that carries one or more gases throughout the aircraft. Upon activation, these gas generating devices opens a valve or other closure to release gas from the gas line or gas pipe to emit stream of gas 114. In still other examples, more, fewer, and/or different gas generating devices than gas generating devices 124a, 124b can be provided with lightning protection apparatus 100, such as shown in FIGS. 2-7.

Lightning protection apparatus 100 can include some or all of coverings 130a, 130b, 130c, 130d, 130e, and 130f, which protect lightning protection apparatus 100 from rain. In other embodiments, some or all of housing 120, insulation layer 128a, inner layer 128b, and coverings 130a, 130b, 130c, 130d, 130e, and 130f are made of a material that prevents rain or hail from gathering along a surface of the housing, such as plastic, rubber, and/or another water-resistant/water-proof material. In other embodiments, some or all of housing 120, insulation layer 128a, inner layer 128b, and coverings 130a, 130b, 130c, 130d, 130e, and 130f are made of a hydrophobic material, such as a hydrophobic plastic, hydrophobic ceramic, or other material.

FIG. 1 also shows several lightning protection apparatus 100 deployed on aircraft 102. Some of these lightning protection apparatus 100 are positioned in high-probability regions for lightning strikes (HPRLSs), such as lightning protection apparatus 100 positioned in: HPRLS 150 at a nose of aircraft 102, HPRLS 154 at a wingtip of aircraft 102, and HPRLS 156 on a tail of aircraft 102. Other lightning protection apparatus 100 can be positioned in other regions of aircraft 102 than in an HPRLS—FIG. 1 shows that two lightning protection apparatus 100 are deployed just forward of the tail of aircraft 102. Also, some HPRLSs do not have lightning protection apparatus 100 deployed, such as HPRLS 152 at a wingtip of aircraft 102, and HPRLS's 158 and 160 located on engine cowlings of aircraft 102. Other HPRLS's and other locations for deploying lightning protection apparatus 100 on an aircraft are possible as well. In other examples, aircraft 102 is deployed with more, fewer, differently-located and/or different lightning protection apparatus 100.

Figures 2, 3, 4, 5, 6, 7:
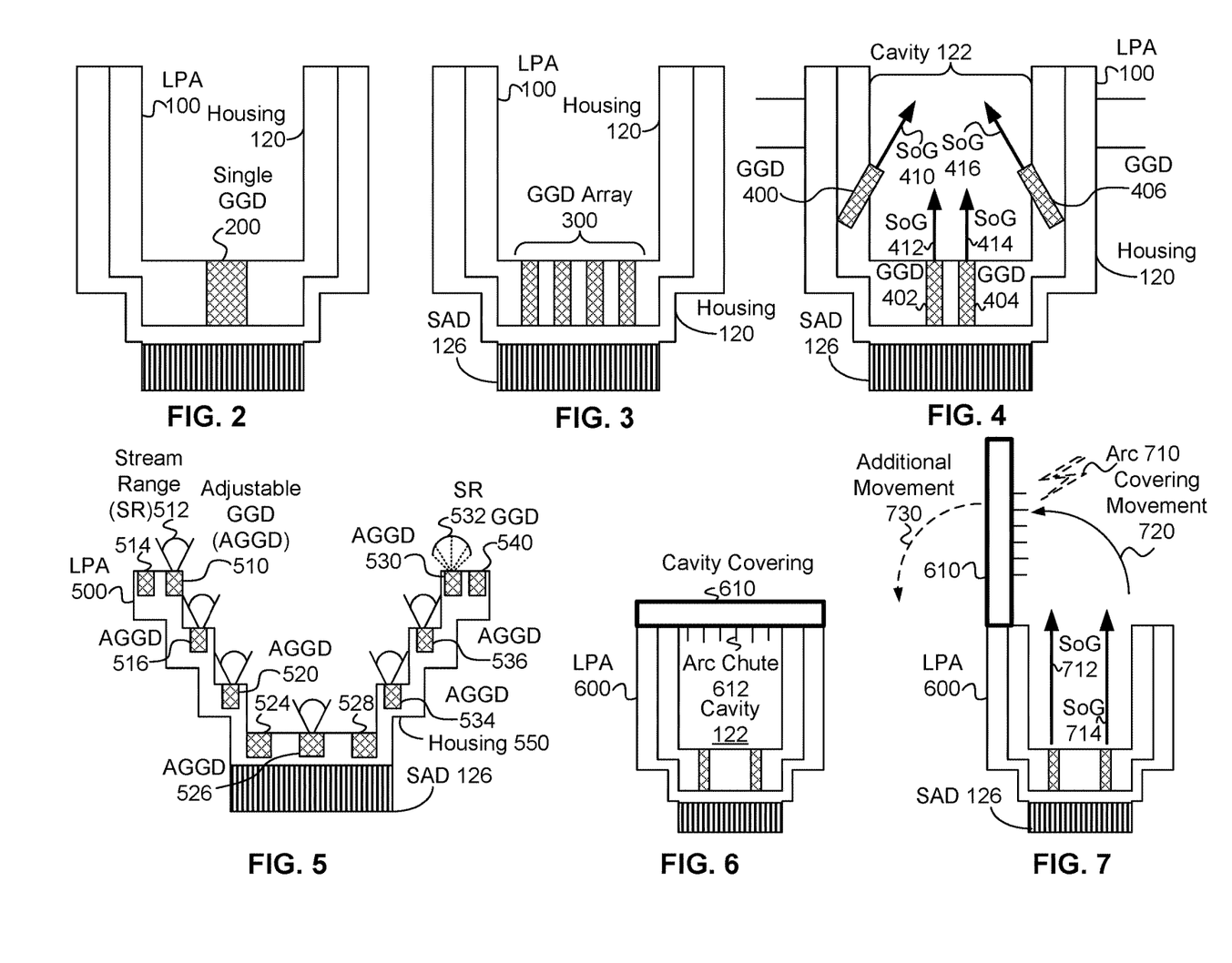
FIGS. 2, 3, 4, 5, 6 and 7 are respective diagrams of lightning protection devices, according to example embodiments.

In some examples, lightning protection apparatus 100 is deployed on or near a surface of aircraft 102; for example, the lightning protection apparatus 100 emitting stream of gas 104 is shown mounted to a surface of aircraft 102. In other examples, part or all of lightning protection apparatus 100 is embedded within aircraft 102. In some of these examples, lightning protection apparatus 100 has a covering over cavity 122 to maintain an aerodynamic surface of aircraft 102, such as shown in FIGS. 6 and 7. Then, when lightning strikes at or near lightning protection apparatus 100, the covering can be moved out of the way and/or otherwise permit stream of gas 114 to be emitted from cavity 122 to suppress and/or extinguish lightning arc 112.

FIGS. 2, 3, 4, 5, 6 and 7 are respective diagrams of lightning protection devices, according to example embodiments. For example, FIGS. 2-7 show various embodiments of lightning protection devices having one or more gas generating devices, gas generating devices directed in a plurality of directions so that a plurality of streams of gas directed in a plurality of directions are emitted by lightning protection apparatus 100, different shaped cavities, and/or one or more gas generating devices whose directions can be changed.

FIG. 2 shows an embodiment of lightning protection apparatus 100 similar to the embodiment of lightning protection apparatus 100 shown in FIG. 1. However, while lightning protection apparatus 100 of FIG. 1 has two gas generating devices 124a, 124b, lightning protection apparatus 100 of FIG. 2 has a single gas generating device 200. Gas generating device 200 is shown as being larger than either of gas generating devices 124a, 124b; in some examples, gas generating device 200 can be smaller or a same size as one or more of gas generating devices 124a, 124b. In other examples where gas generating device 200 is larger, gas generating device 200 can be configured to generate a larger and/or faster stream of gas than either of gas generating devices 124a, 124b.

FIG. 3 shows an embodiment of lightning protection apparatus 100 similar to the embodiment of lightning protection apparatus 100 shown in FIG. 1. However, while lightning protection apparatus 100 of FIG. 1 has two gas generating devices 124a, 124b, lightning protection apparatus 100 of FIG. 3 has gas generating device array 300 with four gas generating devices. In some examples, gas generating device array 300 has three, five, or more gas generating devices.

In other examples, when signal acquisition device 126 detects signal(s) related to lightning, signal acquisition device 126 sends activation signals to all four gas generating devices of gas generating device array 300 at once. In still other examples, when signal acquisition device 126 detects signal(s) related to lightning, signal acquisition device 126 sends activation signals to some, but not all, gas generating devices of gas generating device array 300. In particular, signal acquisition device 126 can send activation signals to one, two, or three activation signals to gas generating devices of gas generating device array 300 when a first arc of lightning is detected, allowing signal acquisition device 126 to send activation signals to previously-not-activated gas generating devices of gas generating device array 300 when one or more later arcs of lightning are detected. Thus, gas generating device array 300 can be used to extinguish multiple arcs of lightning striking in a same portion of aircraft 102 during one flight.

FIG. 4 shows an embodiment of lightning protection apparatus 100 similar to the embodiment of lightning protection apparatus 100 shown in FIG. 3. However, while lightning protection apparatus 100 of FIG. 3 has four gas generation devices in gas generating device array 300 all pointing in a same direction, lightning protection apparatus 100 of FIG. 4 has four gas generating devices 400, 402, 404, 406 pointing in three different directions. More specifically, gas generating devices 402 and 404 are both pointed vertically (with respect to FIG. 4), gas generating device 400 is pointed at an approximately 30° angle clockwise to vertical, and gas generating device 406 is pointed at an approximately 30° angle counterclockwise to vertical. Also, gas generating devices 400 and 406 are respectively embedded in the left and right sides of housing 120, while gas generating devices 402 and 404, like each of gas generating devices 124a, 124b, 200 and gas generating device array 300, are embedded in a base of housing 120 just above signal acquisition device 126. As such, gas generating devices 400, 402, 404, and 406 have a different pattern of gas flow provided by respective streams of gas 410, 412, 414, and 416 than a pattern of gas flow provided by streams of gas generated by gas generating device array 300. Further, as gas generating devices 400 and 406 are closer to an opening of cavity 122 than gas generating devices 402 and 404, streams of gas 410 and 416 may leave cavity 122 relatively faster, and perhaps relatively stronger, than streams of gas 412 and 414.

In some examples, when signal acquisition device 126 detects signal(s) related to lightning, signal acquisition device 126 sends activation signals to all four gas generating devices 400, 402, 404, 406 at once. In still other examples, when signal acquisition device 126 detects signal(s) related to lightning, signal acquisition device 126 sends activation signals to some, but not all, gas generating devices 400, 402, 404, 406. In particular, signal acquisition device 126 can send activation signals to one, two, or three activation signals to gas generating devices 400, 402, 404, 406 when a first arc of lightning is detected, allowing signal acquisition device 126 to send activation signals to previously-not-activated gas generating devices of gas generating devices 400, 402, 404, 406 when one or more later arcs of lightning are detected. Thus, like gas generating device array 300, gas generating devices 400, 402, 404, 406 can be used to extinguish multiple arcs of lightning striking in a same portion of aircraft 102 during one flight.

FIG. 5 shows an embodiment of lightning protection apparatus 100, indicated as lightning protection apparatus 500. FIG. 5 shows lightning protection apparatus 500 with components of lightning protection apparatus 100 discussed above in the context of FIG. 1, such as signal acquisition device 126. Lightning protection apparatus 500 has eleven gas generation devices 510, 514, 516, 520, 524, 526, 528, 530, 534, 536, and 540. Of these gas generation devices, seven are adjustable gas generation devices (AGGDs) 510, 516, 520, 526, 530, 534, and 536, while the remaining gas generation devices 514, 524, 528, 540 are not adjustable and thus can be termed non-adjustable gas generation devices.

An adjustable gas generation device is a gas generation device that is movable according to at least one degree of freedom, such as a rotational degree of freedom shown in FIG. 5. That is, each of adjustable gas generation devices 510, 516, 520, 526, 530, 534, and 536 can be positioned (e.g., rotated or otherwise moved) within a stream range of directions. In some examples, an adjustable gas generation device can be either a free adjustable gas generation device or a fixed adjustable gas generation device, where a free adjustable gas generation device can be moved without restrictions (i.e., moved freely) within its stream range, and wherein a fixed adjustable gas generation device can be moved without restrictions within its stream range can be positioned to point in one of two or more pre-determined (i.e., fixed) directions within its stream range.

For example, adjustable gas generation device 510 is a free gas generation device that can be freely positioned within stream range 512 to point in any direction from approximately 25 degrees left of vertical (with respect to FIG. 5) to approximately 25 degrees right of vertical; that is, adjustable gas generation device 510 can be freely positioned within the approximately 50 degrees of freedom depicted by stream range 512. As another example, adjustable gas generation device 530 is a fixed gas generation device that can be positioned within stream range 532 of approximately 90 degrees. Gas generation device 530 can be adjusted to point any one of five fixed directions: indicated in FIG. 5 using dashed lines: a first fixed direction approximately 45 degrees left of vertical, at a second fixed direction approximately 30 degrees left of vertical, at a third fixed, approximately vertical direction, at a fourth fixed direction approximately 30 degrees right of vertical, or at a fifth fixed direction approximately 45 degrees left of vertical. In some examples, adjustable gas generation devices can have free movement within other stream ranges and/or can be positioned to point in other fixed directions within a stream range are possible as well, including more, fewer, and/or different stream ranges and/or fixed directions than discussed above. In some examples, each adjustable gas generation device of a lightning protection apparatus can: have the same stream range; be a free gas generation device, and/or be a fixed gas generation device.

FIG. 5 shows that sizes of gas generation devices used by lightning protection apparatus 500 vary; for example, gas generation devices 524, 526, and 528 are larger than gas generation devices 510, 514, 516, 520, 530, 534, 536, and 540. In other examples, all of the gas generation devices used by a lightning protection apparatus have the same size (such as discussed above in regarding FIGS. 1-4).

As shown in FIG. 5, combinations of both adjustable gas generation devices and non-adjustable gas generation devices are used by lightning protection apparatus 500. In other examples, a lightning protection apparatus can have only adjustable gas generation devices or can have only non-adjustable gas generation devices (such as discussed above in regarding FIGS. 1-4).

FIG. 5 also shows housing 550 of lightning protection apparatus 500 having a ziggurat shape. In other examples, housing 550 of lightning protection apparatus 500 has a rectangular shape similar to housing 120 shown in FIGS. 1-4, a partially or completely curved shape, a partially or completely pointed shape, a partially or completely tapered shape, a partially or completely undulating shape, a partially ziggurat-shaped shape and/or is otherwise shaped.

In some examples, adjustable gas generation devices are adjusted manually and/or by an entity other than lightning protection apparatus 500; while in other examples, lightning protection apparatus 500 can adjust one or more adjustable gas generation devices; e.g., signal activation unit 124 can generate and send one or more signals to an adjustable gas generation device to direct the adjustable gas generation device to move.

In still other examples, an adjustable gas generation device can move in more and/or different degrees of freedom; e.g., translate along one or more of an X, Y, or Z, axis; rotate among one or more other axes than shown in FIG. 5. In some examples, the adjustable gas generation device has a rotatable/adjustable nozzle that enable translational, rotational, and/or other movement of a stream of gas (via the nozzle) according to one or more degrees of freedom. In some of these examples, an adjustable gas generation device is mounted on one or more gimbals, slides, hinges, and/or other rotation and/or translation mechanisms that enable translational, rotational, and/or other movement of the adjustable gas generation device according to one or more degrees of freedom.

In these examples, the adjustable gas generation device can be: a fixed adjustable gas generation device in all degrees of freedom, a free adjustable gas generation device in all degrees of freedom, or a fixed adjustable gas generation device in one or more degrees of freedom while being a free adjustable gas generation device in one or more other degrees of freedom; e.g., a gas generation device that can be rotated freely while being translated in an X (or other) dimension to one of two fixed locations.

FIGS. 6 and 7 show an embodiment of lightning protection apparatus 100, indicated as lightning protection apparatus 600. FIG. 6 shows lightning protection apparatus 600 with components of lightning protection apparatus 100 discussed above in the context of FIG. 1 and further including cavity covering 610 that is shown over cavity 122. Cavity covering 610 can be used in examples where part or all of lightning protection apparatus 600 is embedded in an object, such as being partially or completely embedded in an aircraft. In the aircraft example, cavity covering 610 can maintain an aerodynamic shape of the aircraft when lightning protection apparatus 600 is not being used to protect the aircraft from lightning.

FIG. 6 shows cavity covering 610 as a rectangular covering; however, in other examples, part or all of cavity covering 610 can be partially or completely curved, pointed, tapered, undulating, ziggurat-shaped, and/or otherwise shaped. FIG. 6 shows cavity covering 610 as a solid object that covers all of cavity 122. In other examples, part or all of cavity covering 610 can be perforated; cavity covering 610 can cover part, but not all, of cavity 122; cavity covering 610 can be a mesh covering, and/or cavity covering 610 can otherwise not completely cover all of cavity 122. In a particular example, cavity covering 610 has holes and/or mesh directly over gas generation devices of lightning protection apparatus 600 to permit streams of gas to flow through cavity covering 610. FIG. 6 shows cavity covering 610 as being made of one layer of material; in other examples, cavity covering 610 has have multiple layers of material.

A bottom portion of cavity covering 610 includes arc chute 612. Arc chute 612 is a set of insulating barriers 612 (shown as vertical lines in FIG. 6, and horizontal lines in FIG. 7) configured to confine, elongate, and/or suppress an arc of lightning. When an arc of lightning L enters into the barriers of arc chute 612, arc L stays within arc chute 612 and wraps around the barriers, thus confining and elongating arc L. In some cases, passing through the barriers of arc chute 612 elongates arc L to a point where a voltage of arc L is insufficient to support the arc, thereby extinguishing arc L. In other examples, lightning protection apparatus 600 is configured with cavity covering 610 without arc chute 612.

FIG. 7 shows lightning protection apparatus 600 shortly after detecting lightning arc 710. In this example, lightning protection apparatus 600 is coupled to an aircraft, such as aircraft 102, and detects lightning arc 710. Upon detection of lightning arc 710, gas generation devices of lightning protection apparatus 600 emit streams of gas 712, 714 which cause cavity covering 610 to open about 90 degrees as shown by covering movement 720. In this example, cavity covering 610 is mounted to a housing of lightning protection apparatus 600 via a hinge or other coupling device that enables streams of gas 712, 714 to move cavity covering 610 and permit streams of gas 712, 714 to suppress and/or extinguish lightning arc 710. Further, covering movement 720 exposes lighting arc 710 to arc chute 612 that aids in suppressing and/or extinguishing arc 710.

In some examples, cavity covering 610 is mounted to a housing of lightning protection apparatus 600 to move according to both covering movement 720 and additional movement 730 to open about 180 degrees. In other examples, cavity covering 610 can make other covering movements when lightning is detected to enable streams of gas emitted by lightning protection apparatus 600 to suppress and/or extinguish lightning arc 710; e.g., cavity covering 610 slides rather than rotate out of the way of streams of gas 712, 714; cavity covering 610 rotates less than 90 degrees or more than 180 degrees.

In still other examples, such as where cavity covering 610 is perforated, is a mesh covering, and/or partially covers the cavity of lightning protection apparatus 600, streams of gas emitted by lightning protection apparatus 600 flows through cavity covering 610 to suppress and/or extinguish lightning arcs. Thus, cavity covering 610 may not be configured to move in at least these examples.

In even other examples, cavity covering 610 is configured to receive a signal from signal acquisition device, such as an activation signal, and move in response to the signal; i.e., cavity covering 610 is motorized and the activation signal starts the motor which moves cavity covering 610. In further other examples, cavity covering 610 returns to the position shown in FIG. 6 (i.e., covering cavity 122) after a lightning arc has been suppressed and/or extinguished.

Figure 8:
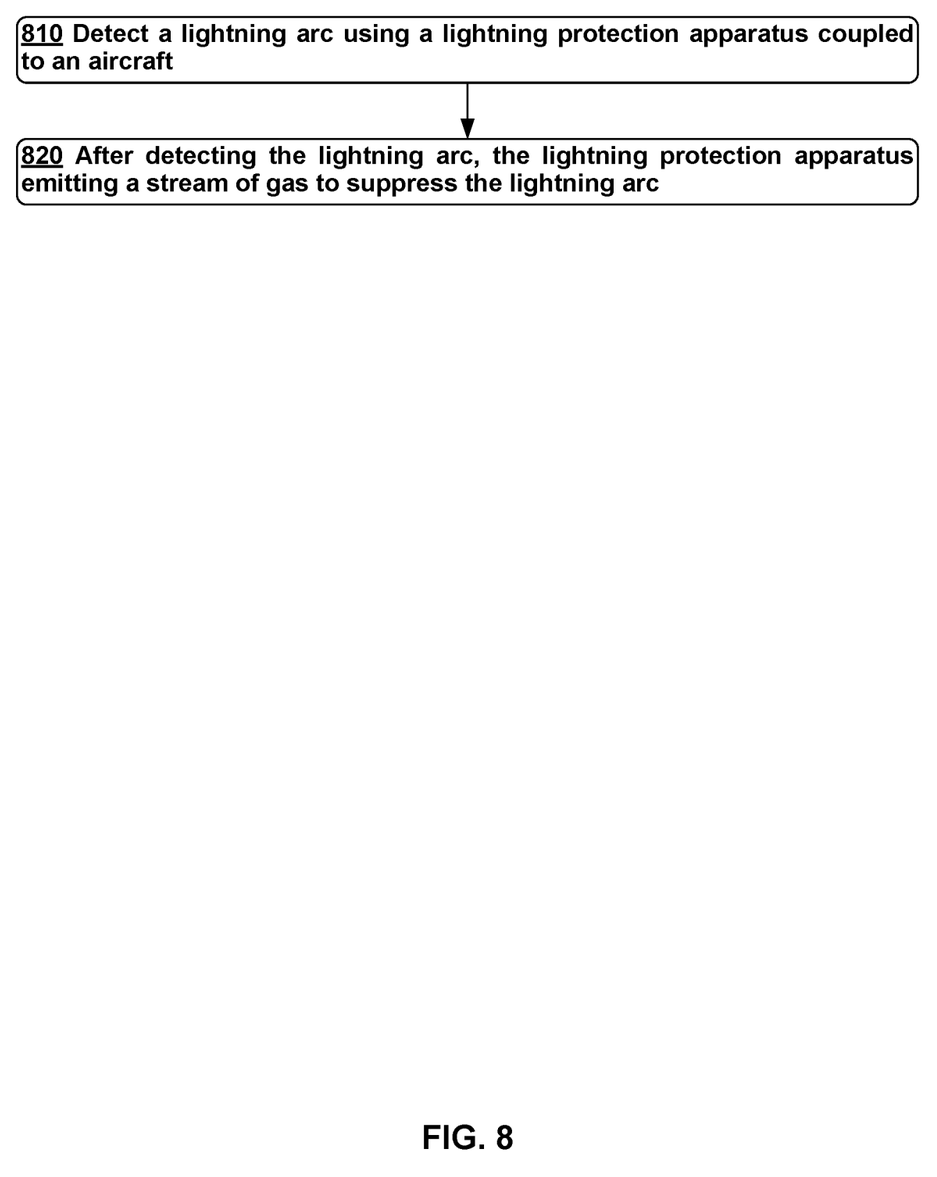
FIG. 8 is a flowchart of a method for suppressing a lightning arc using a lightning protection device, according to an example embodiment.

FIG. 8 is a flowchart of method 800 for suppressing a lightning arc using a lightning protection device, according to an example embodiment. Method 800 begins at block 810, where the lightning protection apparatus, which is coupled to an aircraft, detects a lightning arc, such as discussed above in the context of at least FIGS. 1 and 7. In some examples, detecting the lightning arc includes detecting one or more of: an electric current associated with the lightning arc, an electric field associated with the lightning arc, and an ionization level associated with the lightning arc, such as discussed above in the context of at least FIG. 1. In other examples, detecting the lightning arc includes detecting the lightning arc before the lightning arc strikes the aircraft, such as discussed above in the context of at least FIG. 1.

At block 820, the lightning protection apparatus, after detecting the lightning arc, emits a stream of gas to suppress the lightning arc, such as discussed above in the context of at least FIGS. 1 and 7. In some examples, emitting the stream of gas includes emitting a plurality of streams of gas, such as discussed above in the context of at least FIGS. 4 and 7. In particular of these examples, emitting the plurality of streams of gas includes emitting the plurality of streams of gas at a plurality of gas-stream angles, such as discussed above in the context of at least FIG. 4. In other examples, the gas is one or more of: air, nitrogen, carbon dioxide, carbon monoxide, sulfur hexafluoride, helium, neon, argon, krypton, and xenon, such as discussed above in the context of at least FIG. 1. In still other examples, emitting the stream of gas includes emitting the stream of gas before the lightning arc strikes the aircraft, such as discussed above in the context of at least FIG. 1.

In some examples, method 800 further includes: embedding at least a portion of the lightning protection apparatus within the body of the aircraft, such as discussed above in the context of at least FIG. 7. In other examples, method 800 further includes: coupling the lightning protection apparatus to a high-probability region for lightning strikes of the aircraft, such as discussed above in the context of at least FIG. 1. In particular of these examples, the high-probability region for lightning strikes of the aircraft is a region associated with one or more of: a tail of the aircraft, a nose of the air craft, a wingtip of the aircraft, and an engine cowling of the aircraft, such as discussed above in the context of at least FIG. 1.

In some examples, the lightning protection apparatus of method 800 includes a housing that defines a cavity; a gas generating device disposed within the housing; and a signal acquisition device, where the signal acquisition device is configured to: detect a lightning arc, and responsively activate the gas generating device to emit a stream of gas to suppress the lightning arc, such as lightning protection apparatus 100, 500, 600 discussed above in the context of at least FIGS. 1-7. In particular of these examples, the lightning protection apparatus is part of a system that includes an aircraft, where the lightning protection apparatus can be coupled to the aircraft, such as discussed above in the context of at least FIGS. 1 and 7. In other examples, the signal acquisition device is configured to detect one or more of: an electric current associated with the lightning arc, an electric field associated with the lightning arc, and an ionization level associated with the lightning arc, such as discussed above in the context of at least FIG. 1.

In still other examples, the housing includes an insulation layer, such as discussed above in the context of at least FIG. 1. In even other examples, the lightning protection apparatus includes one or more coverings for preventing water accumulation on a surface of the housing, such as discussed above in the context of at least FIG. 1. In yet other examples, the lightning protection apparatus includes a plurality of gas generating devices that include the gas generating device, such as discussed above in the context of at least FIGS. 1, 3, 4, 5, 6, and 7. In particular of these examples, the plurality of gas generating devices is configured to emit a plurality of streams of gas at a plurality of gas-stream angles, such as discussed above in the context of at least FIG. 4. In further other examples, the lightning protection apparatus includes an arc chute configured to elongate the lightning arc, such as discussed above in the context of at least FIGS. 6 and 7.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art.

What is claimed is:

1. A lightning protection apparatus, comprising:
    a housing coupled to an aircraft, wherein the housing defines a cavity having a base exposed to ambient environment of the lightning protection apparatus;
    a gas generating device disposed within the housing at the base of the cavity; and
    a signal acquisition device to:
        detect a lightning arc, and
        responsively activate the gas generating device to emit a stream of gas toward the cavity and out of the housing into the ambient environment of the lightning protection apparatus to suppress the lightning arc.

2. The lightning protection apparatus of claim 1, wherein the signal acquisition device detects one or more of: an electric current associated with the lightning arc, an electric field associated with the lightning arc, and an ionization level associated with the lightning arc.

3. The lightning protection apparatus of claim 1, wherein the housing comprises an insulation layer.

4. The lightning protection apparatus of claim 1, further comprising:
    one or more coverings positioned over the cavity for preventing water accumulation on a surface of the housing.

5. The lightning protection apparatus of claim 1, wherein the signal acquisition device detects the lightning arc before the lightning arc strikes the aircraft.

6. The lightning protection apparatus of claim 1, comprising a plurality of gas generating devices that include the gas generating device.

7. The lightning protection apparatus of claim 1, wherein at least part of the lightning protection apparatus is embedded within a body of the aircraft.

8. The lightning protection apparatus of claim 1, wherein the gas is one or more of: air, nitrogen, carbon dioxide, carbon monoxide, sulfur hexafluoride, helium, neon, argon, krypton, and xenon.

9. The lightning protection apparatus of claim 1, wherein the lightning protection apparatus is coupled to a high-probability region for lightning strikes of the aircraft, and wherein the high-probability region for lightning strikes of the aircraft is a region associated with one or more of: a tail of the aircraft, a nose of the aircraft, a wingtip of the aircraft, and an engine cowling of the aircraft.

10. The lightning protection apparatus of claim 1, further comprising an arc chute to elongate the lightning arc.

11. The lightning protection apparatus of claim 5, wherein the signal acquisition device activates the gas generating device to emit the stream of gas before the lightning arc strikes the aircraft.

12. The lightning protection apparatus of claim 6, wherein the plurality of gas generating devices emit a plurality of streams of gas at a plurality of gas-stream angles.

13. A method for suppressing a lightning arc, comprising:
    detecting a lightning arc using a lightning protection apparatus coupled to an aircraft, wherein detecting the lightning arc comprises detecting one or more of: an electric current caused by the lightning arc, an electric field caused by the lightning arc, and an ionization level caused by the lightning arc, and wherein detecting the lightning arc comprises detecting the lightning arc before the lightning arc strikes the aircraft, and wherein the lightning protection apparatus comprises a housing coupled to the aircraft and the housing defines a cavity having a base exposed to ambient environment of the lightning protection apparatus; and
    after detecting the lightning arc, the lightning protection apparatus emitting a stream of gas toward the cavity and out of the housing so as to emit the stream of gas into ambient environment of the lightning protection apparatus to suppress the lightning arc.

14. The method of claim 13, wherein emitting the stream of gas comprises emitting a plurality of streams of gas.

15. The method of claim 13, further comprising:
    embedding at least a portion of the lightning protection apparatus within a body of the aircraft.

16. The method of claim 13, wherein the gas is one or more of: air, nitrogen, carbon dioxide, carbon monoxide, sulfur hexafluoride, helium, neon, argon, krypton, and xenon.

17. The method of claim 14, wherein emitting the plurality of streams of gas comprises emitting the plurality of streams of gas at a plurality of gas-stream angles.

18. A system, comprising:
    an aircraft; and a lightning protection apparatus coupled to the aircraft, comprising:
  a housing, wherein the housing defines a cavity having a base exposed to ambient environment of the lightning protection apparatus;
  a gas generating device disposed within the housing at the base of the cavity; and
  a signal acquisition device to:
    detect a lightning arc, and
    responsively activate the gas generating device to emit a stream of gas toward the cavity and out of the housing into the ambient environment of the lightning protection apparatus to suppress the lightning arc.

19. The system of claim 18, wherein the signal acquisition device detects one or more of: an electric current associated with the lightning arc, an electric field associated with the lightning arc, and an ionization level associated with the lightning arc.

20. The system of claim 18, wherein the signal acquisition device activates the gas generating device to emit the stream of gas before the lightning arc strikes the aircraft.

* * * * *